United States Patent
Barrett

[15] 3,685,491
[45] Aug. 22, 1972

[54] METHOD AND APPARATUS FOR RELEASING GAME BIRDS AS TARGETS

[72] Inventor: Orvis G. Barrett, 12102 Westgard, Houston, Tex. 77044

[22] Filed: Feb. 1, 1971
[21] Appl. No.: 111,515

[52] U.S. Cl. ............................119/15.6, 119/82, 119/29
[51] Int. Cl. .............................................A01k 15/00
[58] Field of Search .........119/15.6, 29, 82; 417/392; 302/21, 40

[56] References Cited

UNITED STATES PATENTS

| | | | |
|---|---|---|---|
| 3,063,415 | 11/1962 | Chapman | 119/29 |
| 3,294,064 | 12/1966 | McKown | 119/15.6 |
| 3,568,643 | 3/1971 | Wessinger | 119/82 |

*Primary Examiner*—Aldrich F. Medbery
*Attorney*—Pravel, Wilson & Matthews

[57] ABSTRACT

A method and apparatus are disclosed for releasing game birds and placing the birds in flight as targets for hunters and sportsmen to shoot.

14 Claims, 4 Drawing Figures

Orvis G. Barrett
INVENTOR

BY

Pravel Wilson & Matthews
ATTORNEYS

METHOD AND APPARATUS FOR RELEASING GAME BIRDS AS TARGETS

BACKGROUND OF THE INVENTION

1. Field of the Invention

The present invention relates to a method and apparatus for releasing game birds as targets for hunters and sportsmen for entertainment, practice and like purposes.

2. Description of the Prior Art

In the prior art, game birds were released as targets for hunters on training or entertainment hunting preserves by being hand-thrown by specially trained throwers or by being released from an open door in cages or coops or other containing structures.

When being hand thrown, the birds were grasped and removed from cages by the thrower, who subsequently threw or released the bird for the hunter to shoot. The birds were often confused by this unnatural procedure, and were balky and would not fly away from the thrower in a natural pattern or manner of flight, as would a game bird in natural surroundings, which was desirable for realistic, effective hunting and training.

When the birds were released directly from cages, a latch or door was opened to permit the game bird to fly from the cage. The birds often would not leave the cage unless urged or forced to do so, confusing the birds and making them balky. When forced from the cage, the birds did not fly in natural pattern of flight, as desired for realistic effective hunting and training.

SUMMARY OF THE INVENTION

Briefly, the present invention provides a method and apparatus for releasing game birds as targets wherein the birds are inserted into a housing and bursts of gas are passed into the housing to eject the bird at a selected time and release such bird as a target for hunters to shoot. A shock absorbent cushion is inserted into the housing adjacent the gas inlet to prevent the burst of gas from harming the bird as such bird is ejected. A lid is mounted with the housing to prevent the bird from escaping prior to the time for ejection, and an interlock prevents the burst of gas from being introduced into the housing until the lid of the housing is open. The course and bearing of the bird upon ejection and release may be varied by adjusting the horizontal position of the apparatus, and the trajectory of the flight path of the bird may be varied by adjusting the inclination of the housing.

BRIEF DESCRIPTION OF THE DRAWINGS

FIG. 3 is a cross-sectional view of a lid closing the apparatus of the present invention to prevent the game birds from scraping; and FIG. 4 is an isometric view of the closing lid of FIG. 3.

DESCRIPTION OF PREFERRED EMBODIMENT

Figure 1:
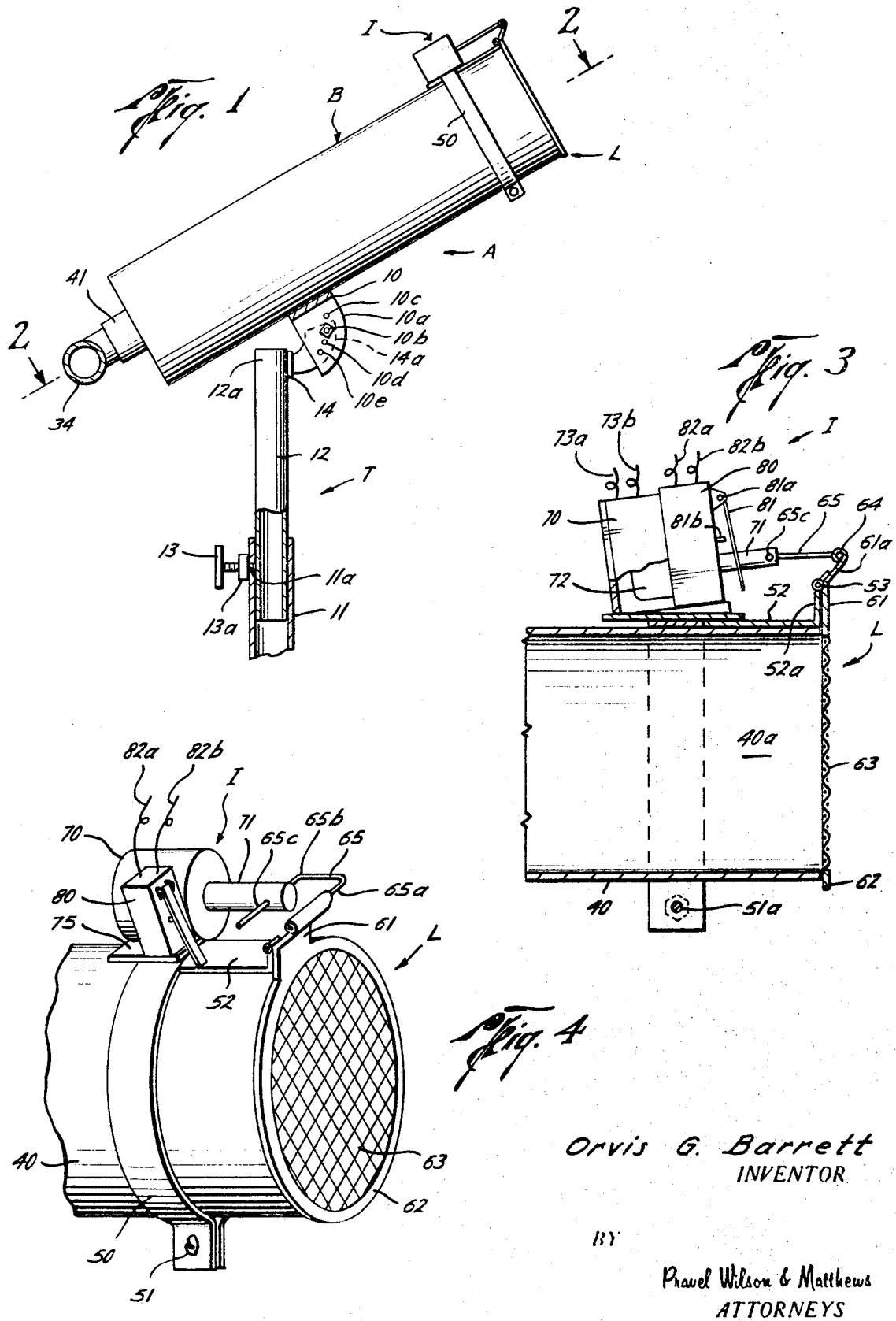
FIG. 1 is an elevation view, partly in section, of the apparatus of the present invention taken along the line 1—1 of FIG. 2.

In the drawings, the letter A designates generally the apparatus of the present invention which is used on hunting preserves to release game birds such as quail, chukar, pheasant and the like as targets for hunters for entertainment and training purposes as such hunters walk along paths. The game birds being released by the apparatus A may be captured wild and released, or hatched and grown in coops domestically, depending on the local game and wildlife conservation laws in effect.

Figure 2:
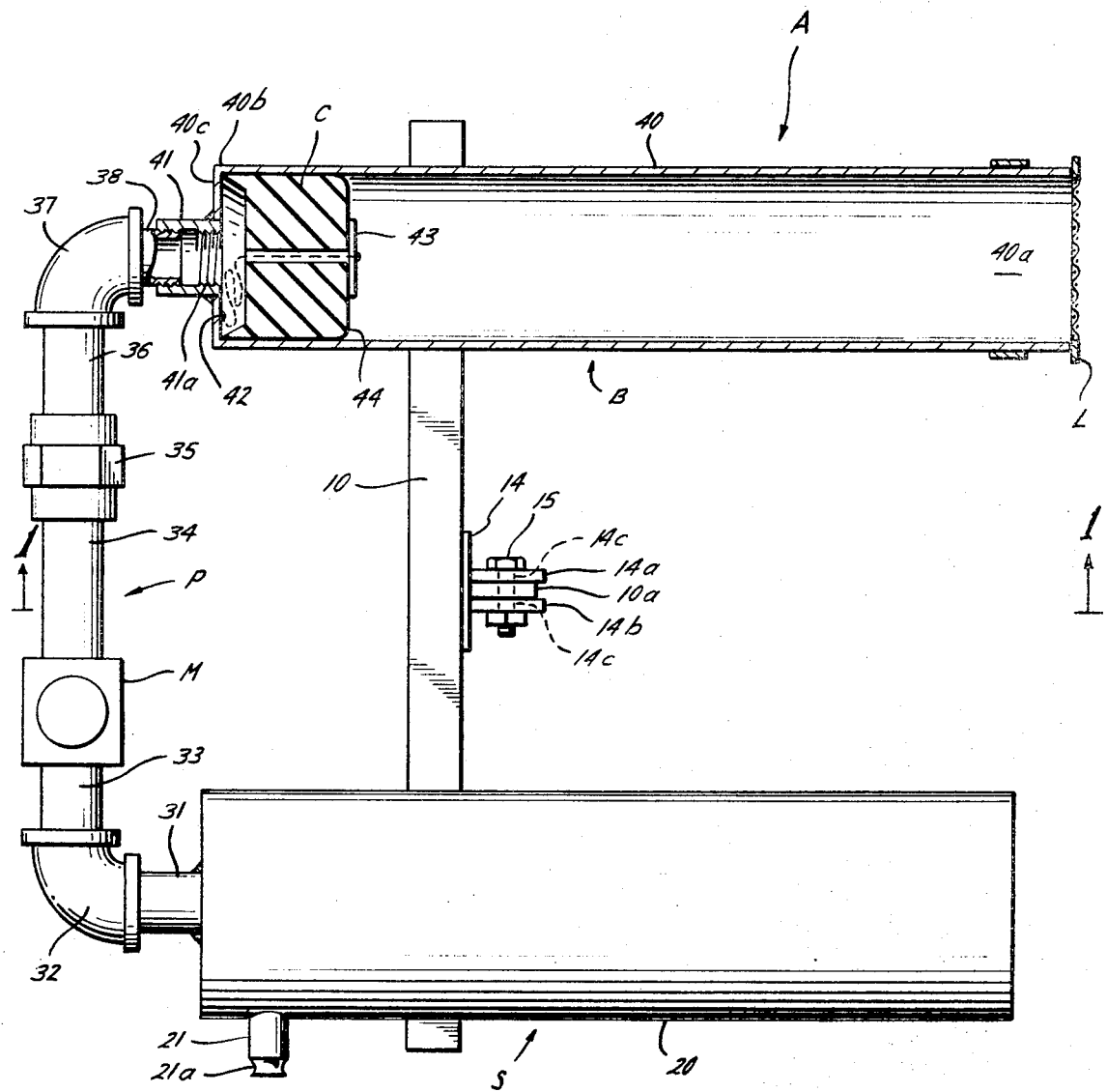
FIG. 2 is a cross-sectional view taken along the line 2—2 of FIG. 1.

The apparatus A includes a barrel B in which the game birds are housed prior to being ejected and released when a burst of gas is furnished to the barrel B from a storage chamber or vessel S through an interconnecting pipe or tube P. The barrel B and the storage chamber S are mounted with an angle iron mounting bar or plate 10 (FIG. 2) atop a supporting post or stake T (FIG. 1).

The supporting stake T includes a lower pipe or tubular member 11 which is mounted at a lower end to the ground by a mounting base, concrete support or the like. An upper mounting pipe 12, of slightly smaller exterior diameter than the interior diameter of the lower member 11, is inserted in the lower member 11. The upper member 12 is movable within the lower member 11 to adjust the elevation of the apparatus A. A wing nut 13 is inserted through a housing 13a mounted with the exterior of the lower member 11, and passes through an aperture 11a in the lower member 11 to engage the exterior of the upper member 12, locking the upper member 12 in the apparatus A in position at the desired elevation. The wing nut 13 may be moved outwardly to release the pressure on the upper member 12 and allow the elevation of the apparatus A to be adjusted by moving the upper member 12 with respect to lower member 11.

A metal bar 14 is welded or otherwise suitably mounted at an upper end 12a of the upper member 12. A pair of curved, or quarter-moon shaped, blades 14a and 14b are mounted with the bar 14 and extend upwardly therefrom. The blades 14a and 14b are spaced with respect to each other and receive therebetween a blade 10a which is mounted beneath the angle iron member 10.

A bolt 15 is inserted through an aperture 14c (FIG. 2) in each of the blade members 14a and 14b and an aperture 10b in the blade member to attach the angle iron member 10 supporting the barrel B and storage chamber S to the supporting stake T.

A plurality of apertures 10c, 10d and 10e are formed in the blade member 10a at selected positions on such blade member. The inclination of the barrel B with respect to the ground is adjusted by aligning a desired one of the apertures 10b, 10c, 10d or 10e with the aperture 14c in the blade members 14a and 14b and inserting the bolt 15 through the aligned apertures. The barrel B is at its lowest angle of inclination with respect to the ground when the bolt 15 is inserted through the aligned apertures 14c and 10c, and is at its highest angle of inclination with respect to the ground when the bolt 15 is inserted through the aligned apertures 14c and 10e.

The courses or bearings along which the game birds are ejected from the apparatus A may be varied by loosening the wing nut 13 and rotating the upper member 12 with respect to the lower member 11. When the desired bearing or course is reached, the wing nut 13 is tightened, securing the upper member 12 to the lower member 11 with the barrel B pointing in the desired course or bearing along which the game bird is to be ejected.

The storage chamber S includes a sealed container 20 for storing a pressurized quantity of a gas, preferably air. The container 20 is mounted with the supporting angle iron member 10 by welding or other suitable techniques. An inlet valve 21a and an inlet conduit 21 are mounted with the container 20 and permit the storage chamber S to be refilled with pressurized quantities of the gas. A suitable pressure for the gas stored in the storage chamber S for the operation of the present invention is 40 or 50 p.s.i.

The interconnecting pipe P provides a passage for communication of the gas stored in the storage chamber S to the barrel B and is connected to the storage chamber S by an inlet gas conduit 31. The inlet gas conduit 31, an elbow fitting 32 and a gas conduit 33 provide communication between the storage chamber S and an electrically controlled, solenoid operated control valve M. The control valve M is normally in a closed position and prevents passage of the gas from the storage chamber S to the interconnecting pipe P to the barrel B.

A gas conduit 34, a union or fitting 35, a gas conduit 36, an elbow 37, and an outlet conduit 38 connect the control valve M to an inlet housing 41 of the barrel B, permitting bursts of gas to pass from the storage chamber S to the barrel B when the solenoid of the control valve M is receiving energy and opening the control valve M.

The barrel B includes a hollow, cylindrical tubular member 40 welded or otherwise suitably mounted with the angle iron support member 10. The tubular member 40 has an open end 40a through which the game bird to be ejected from the apparatus A is inserted. A lid L closes the open end 40a after the bird is inserted and prevents the escape of the bird, as will be more evident hereinbelow.

The inlet housing 41 is mounted at a lower end 40b of the tubular member 40 opposite the open end 40a and permits the burst of gas to enter the barrel B from the interconnecting pipe P when the control valve M opens.

A cushion or pad C of foam rubber or other suitable resilient material is inserted in the tubular member 40 adjacent the lower end 40b before the game bird is inserted into the barrel B, to prevent damage to the bird from the burst of gas entering the barrel B from the interconnecting pipe P. The cushion C is preferably of a somewhat larger diameter than the tubular member 40 so that the cushion C is slightly compressed as it is inserted in the barrel B to provide a sealing action and prevent leakage of the burst of gas as such gas enters the barrel B, providing a uniform ejecting motion to be imparted to the game bird in the barrel B by the apparatus A.

A retaining chain or rope 42 is mounted at a first end thereof at a rear wall 40c of the tubular member 40. The retaining chain 42 passes through the center of the cushion C and is mounted at a second end of such chain to a retaining plate 43. The retaining plate 43 is mounted to a surface 44 of the cushion C facing the open end 40a and the lid L mounted at such end of the barrel B. The retaining chain 42 prevents unnecessary travel of the cushion C when the game bird is ejected from the barrel B and further provides ease of location and retrieval of the cushion C for the next operation of the apparatus A.

Inner barrels are inserted into the tubular member 40 and mounted therein when it is desired to eject game birds of different sizes, such as for example quail. Such inner barrels are formed from tubular members of like structure to the tubular member 40 but are of slightly smaller diameters than the tubular member 40 in accordance with the size of the particular game bird to be ejected from the apparatus A.

The inner barrel has an inlet coupling of like structure to the inlet coupling 41. The inlet coupling of the inner barrel has a threaded exterior surface which engages a threaded interior surface 41a of the inlet coupling 41 of the tubular member 40 to allow the inner barrel to be mounted within the tubular member 40. The cushion C and the retaining chain 42 are removed from the tubular member 40 prior to inserting the smaller inner barrel, and a slightly smaller cushion having a retaining chain is inserted into the smaller inner barrel after such inner barrel is mounted with the tubular member 40.

The lid L (Figs. 3 and 4) is mounted with the barrel B at the open end 40a of the tubular member 40 and closes the barrel B after the game bird is inserted or housed therein, preventing the game bird from escaping from the barrel B until it is desired to eject such bird. An interlock I is mounted with the lid L and prevents the control valve M from opening until the lid L has opened, as will be more evident hereinbelow, to prevent damage or harm to the game bird as such bird is ejected from the apparatus A.

The interlock I and the lid L are mounted with the exterior of the tubular member 40 adjacent the open end 40a by a mounting collar 50 which is held in place by a nut 51 and bolt 51a or other suitable fastening means. An L-shaped adapting member 52 extends from the mounting collar 50 along the exterior of tubular member 40 to a position adjacent the open end 40a of the barrel 40. A portion 52a of the attaching member 52 extends outwardly from the exterior of the tubular member 40 to a hinge 53 about which the lid L is pivotally mounted.

The lid L is mounted with the hinge 53 by an arm or handle 61 which extends from the hinge 53 to a mounting rim or collar 62. The collar 62 extends about the periphery of the open end 40a of the tubular member 40 and supports a screen or mesh 63 which covers the open end 40a when the lid L is closed to prevent the game bird from escaping from the barrel B. The screen 62 further permits the passage of light into the barrel B so that the game bird inserted in the barrel sees light but feels enclosed and hidden within the barrel B, giving the game bird a similar impression to that when such bird is hidden in natural undergrowth.

A connecting portion 61a of the arm 61 extends from the hinge 53 to a sleeve 64. The sleeve 64 receives therein an arm 65a of a U-shaped link or connector 65. A second arm 65b of the connector 65 is mounted with a plunger rod 71 of a solenoid 70 of the interlock I by being inserted through an aperture formed in the plunger rod 71.

The interlock means I includes the solenoid 70 and a contact switch or microswitch 80 which are mounted to the collar 50 by a mounting plate 75. A coil 72 of the solenoid 70 is connected by a pair of inlet conductors 73a and 73b in a series electrical circuit arrangement with a power source or battery and an operating switch. When the operating switch is closed, electrical current flows through the coil 72 of the solenoid 70 drawing the plunger 71 into the solenoid 70 and causing the lid L to pivot about the hinge 53 to a position where the open end 40a of the barrel B is unobstructed.

A contact arm 81 of the microswitch 80 is pivotally movable about a mounting 81a and moves when contacted by a portion 65c of the second arm 65b of the connector 65 to engage a contact button 81b. The contact button 81b when contacted by the arm 81 closes an electrical circuit between a pair of input conductors 82a and 82b and permits electrical current to flow through such conductors. The conductors 82a and 82b connect the microswitch 80 in a series electrical circuit arrangement with a power source or battery and the electrically operated solenoid control valve M.

When the microswitch 80 is open, no current can flow from the power source to the control valve M, preventing bursts of gas from passing from the storage chamber S to the barrel B. When the microswitch 80 is closed, current flows from the battery through the conductors 82a and 82b to the control valve M, opening such valve and permitting a burst of gas to enter the barrel B to eject the game bird from the apparatus A.

In the operation of the present invention, the cushion C is retrieved after the prior release of a game bird as a target and inserted into the barrel B. Should it be desired to adjust the trajectory of release of the game bird or the horizontal position or bearing along which the game bird is to be released, such adjustments are made in the manner previously set forth. A game bird is then removed from a storage coop or cage and inserted in the barrel B. The lid L is then moved to a position closing the open end 40a of the barrel B, preventing the game bird from escaping. When the hunter reaches the desired shooting position, the operating switch is closed, energizing the solenoid 70. The plunger 71 of the solenoid 70 is drawn inwardly, causing the lid L to pivot and open the barrel B. The portion 65c of the connector 65 engages the contact arm 81 of the microswitch 80 when the plunger 71 moves inwardly, closing an electrical circuit and allowing electrical current to flow to the electrically operated control valve M. When the control valve M opens, a burst of gas from the storage chamber S passes through the control valve M and the interconnecting pipe P into the inlet housing 41 of the barrel B. The burst of gas forces the cushion C out of the barrel B and ejects the game bird from the apparatus A along a predetermined course and trajectory as a target for the hunter to shoot. The abrupt movement of the game bird from the barrel B startles the game bird and causes such bird to begin flight in much the same manner as the game bird would fly when startled by a hunter or his dog in natural surroundings, thereby providing realistic and effective hunting and training for hunters.

The foregoing disclosure and description of the invention are illustrative and explanatory thereof, and various changes in the size, shape, and materials as well as in the details of the illustrated construction may be made without departing from the spirit of the invention.

I claim:

1. An apparatus for releasing game birds as targets for hunters for entertainment and training purposes, comprising:
   a. storage means for containing a gas under pressure;
   b. barrel means for housing the game birds to be released;
   c. means interconnecting said storage means and said barrel means; and
   d. control means for selectively permitting bursts of gas to pass through said interconnecting means from said storage means to said barrel means, wherein the game bird is ejected from said barrel means and released as a target for hunters to shoot.

2. The structure of claim 1, further including:
cushion means mounted in said barrel means to prevent the bursts of gas entering said barrel means from damaging the game bird as such birds are ejected and released.

3. The structure of claim 2, further including:
retaining means mounted with said barrel means and said cushion means wherein said cushion means is retained with said barrel means when the birds are ejected and released.

4. The structure of claim 1, further including:
lid means mounted with said barrel means for preventing the game bird from escaping from said barrel means, said lid means closing said barrel means when the bird is housed therein and opening when the bird is ejected and released.

5. The structure of claim 4, further including:
interlock means for preventing operation of said control means when said lid means is closed.

6. The structure of claim 5 wherein said interlock means comprises:
   a. solenoid means for opening said lid means; and
   b. contact means responsive to opening of said lid means for energizing said control means.

7. The structure of claim 1, further including:
inner barrel means for housing game birds, said inner barrel means being mounted in said barrel means when game birds of different sizes are to be housed in said barrel means.

8. The structure of claim 1, wherein said support means comprises:
means for adjusting the horizontal position of said barrel means wherein the birds are ejected along selected different courses and bearings with respect to the hunters.

9. The structure of claim 1, wherein said support means comprises:
means for adjusting the inclination of said barrel means wherein the birds are ejected along flight paths of selected trajectories.

10. A method of releasing game birds as targets for hunters for entertainment and training purposes, comprising:

a. inserting the game bird into a housing member having communication with a gas operating means;
b. actuating the operating means to introduce a burst of gas into said housing member; and
c. ejecting the game bird from said housing member with said gas whereby the bird is released as a target for the hunters.

11. The method of claim 10, further including the step of:
inserting a shock absorbing cushion into the member prior to said step of inserting the bird whereby the burst of gas does not harm the bird.

12. The method of claim 10, further including the step of:
closing a retaining lid on said housing member subsequent to said step of inserting the bird, whereby the bird is prevented from escaping prior to ejection.

13. The method of claim 10, further including the step of:
adjusting the horizontal position of the housing member whereby the birds are ejected along selected courses and bearings with respect to the hunters.

14. The method of claim 10, further including the step of:
adjusting the inclination of the housing member whereby the birds are ejected along flight paths of selected trajectories.

* * * * *